United States Patent [19]

Foltz

[11] 4,078,729
[45] Mar. 14, 1978

[54] MANURE SPREADER VEHICLE WITH HEATED FLOOR

[76] Inventor: Gary Lynn Foltz, Rte. 1, Box 241A, Berryville, Va. 22611

[21] Appl. No.: 734,543

[22] Filed: Oct. 21, 1976

[51] Int. Cl.² .............................................. A01C 23/00
[52] U.S. Cl. .................................... 239/662; 239/679; 239/135; 219/214; 219/345
[58] Field of Search ............... 239/672, 130, 679, 135, 239/680, 662; 222/146 H, 146 HE; 298/1 H; 105/451; 219/214, 202, 455, 459, 460, 465, 345

[56] References Cited

U.S. PATENT DOCUMENTS

| | | | |
|---|---|---|---|
| 2,733,770 | 2/1956 | Tourneau | 298/1 H |
| 2,945,938 | 7/1960 | Alvord | 105/451 X |
| 3,084,942 | 4/1963 | Kucera | 239/679 X |
| 3,123,363 | 3/1964 | Hedtke | 239/662 X |
| 3,603,764 | 9/1971 | Martin | 219/345 X |
| 3,775,588 | 11/1973 | Niehenke | 219/345 UX |

Primary Examiner—John J. Love
Attorney, Agent, or Firm—Marcus L. Bates

[57] ABSTRACT

A vehicle has an upwardly opening bed mounted thereon within which manure can be stored. A manure spreader device is located at the trailing end of the vehicle, and a conveyor means moves manure from the interior of the bed into contact with the spreader device, whereupon the manure is uniformly spread over the terrain in the usual manner.

A plurality of heated panels are attached to the underside of the floor of the bed. Each heated panel includes electrical heating elements therein which are arranged so that the floor of the bed is heated to a temperature which prevents the manure from freezing thereto.

The panels are individually affixed to the floor of the bed in such a manner that they can be replaced.

7 Claims, 8 Drawing Figures

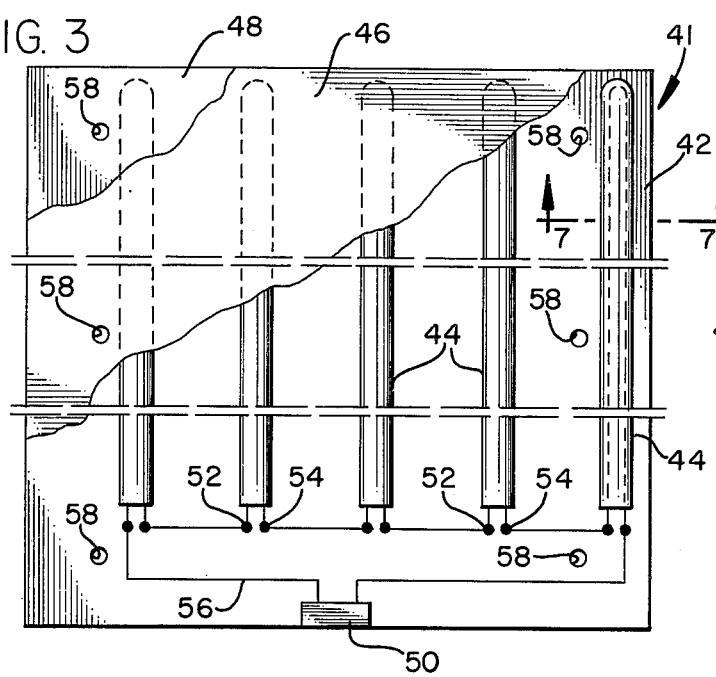
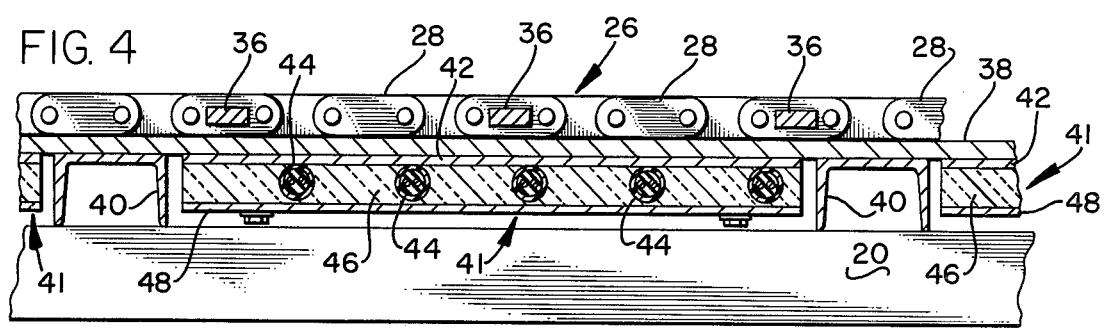
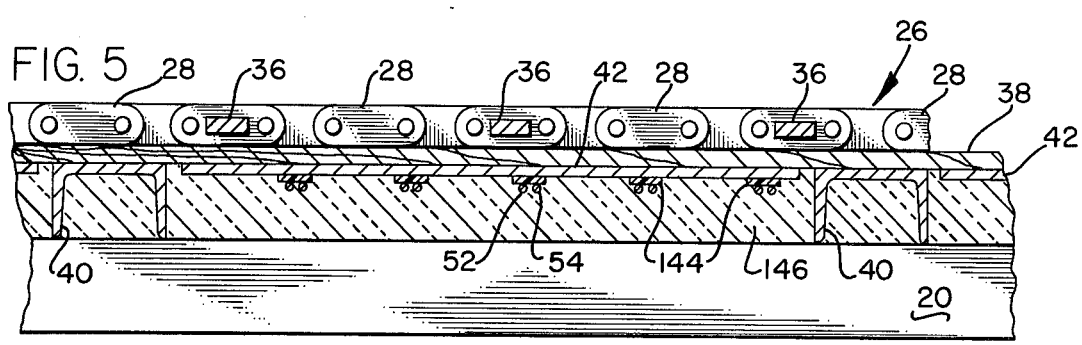
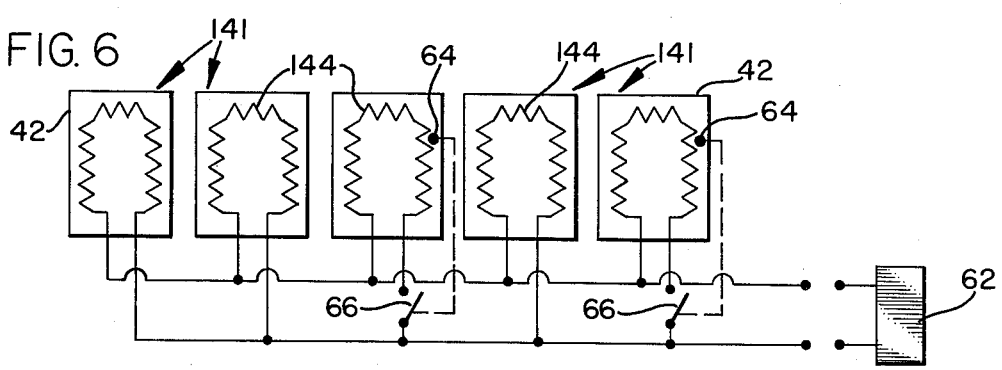

MANURE SPREADER VEHICLE WITH HEATED FLOOR

BACKGROUND OF THE INVENTION

Farmers usually apply manure to their farmland during the winter months for the reason that there are no crops growing at this time. Furthermore, the farmer must always arrange his work schedule in such a manner that he can spread his multiplicity of unending tasks over the entire year.

However, during the winter, freezing temperatures cause the manure to freeze to the bottom of the bed of the manure spreader vehicle. This unfortunate circumstance may cause the cross-pieces or chains of the conveyor to freeze to the floor, thereby damaging the drive chains and drive cogs located on the rear of the spreader.

It is therefore desirable to be able to maintain the bed of a manure spreader apparatus above freezing temperatures by utilizing electric current for electricaly heating the floor of the bed.

It is desirable that the heating apparatus have the capability of being retrofitted onto the bed of old manure spreading vehicles, and alternatively, that the heating apparatus have the capability of being affixed to manure spreader vehicles presently being manufactured. Furthermore, it is desirable that the heating apparatus should be readily replaceable in the event an unforeseen malfunction should occur thereto.

SUMMARY OF THE INVENTION

This invention relates to farm equipment, and specifically to a heating apparatus by which the floor of a manure spreader vehicle can be heated to a temperature which prevents manure from freezing thereto. The heating apparatus includes a plurality of individual panels, each having an electrical heating element incorporated therewithin, with the panel being removably mounted in heat transfer relationship resepctive to the lower face of the floor which forms the bed of the vehicle.

The panels are therefore each attached to the floor and insulated in such a manner that almost all of the heat is transferred from the panel into the floor, thereby elevating the temperature of the manure which is located immediately adjacent to the floor so that freezing of the manure to the floor is obviated.

The heating elements are replaceably mounted in underlying relationship to the floor of the vehicle and include circuitry by which domestic current can be utilized to elevate the temperature of the floor.

Accordingly, the primary object of the present invention is the provision of means by which the freezing of manure to the floor of a manure spreading vehicle is obviated.

A further object of the invention is the provision of individual heating panels which may be removably affixed in underlying relationship to the floor of a manure spreader vehicle.

Another object of the invention is to provide a thermostatically controlled heating means in combination with the floor of a manure spreader vehicle which prevents manure from freezing to the floor.

A still further object of this invention is to disclose and provide improvements in a manure spreader vehicle which prevents damage occurring as a result of manure freezing to the floor.

Another and still further object of the present invention is the provision of a plurality of spaced panels having heating elements therein in combination with the floor of the bed of a manure spreader vehicle which elevates the interface between manure contained within the bed and the floor so that freezing of the manure to the bed is prevented.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 3 is an enlarged, top plan view of part of the apparatus disclosed in FIGS. 1 and 2;

FIG. 4 is an enlarged cross-sectional view taken along line 4—4 of FIG. 2;

FIG. 5 sets forth a modification of the apparatus seen disclosed in FIG. 4;

FIG. 6 is a schematical illustration of electrical circuitry used in the present invention; and, FIGS. 7 and 8 are cross-sectional views, either of which may be taken along line 7—7 of FIG. 3.

DETAILED DESCRIPTION OF THE PREFERRED EMBODIMENT

Figure 1:
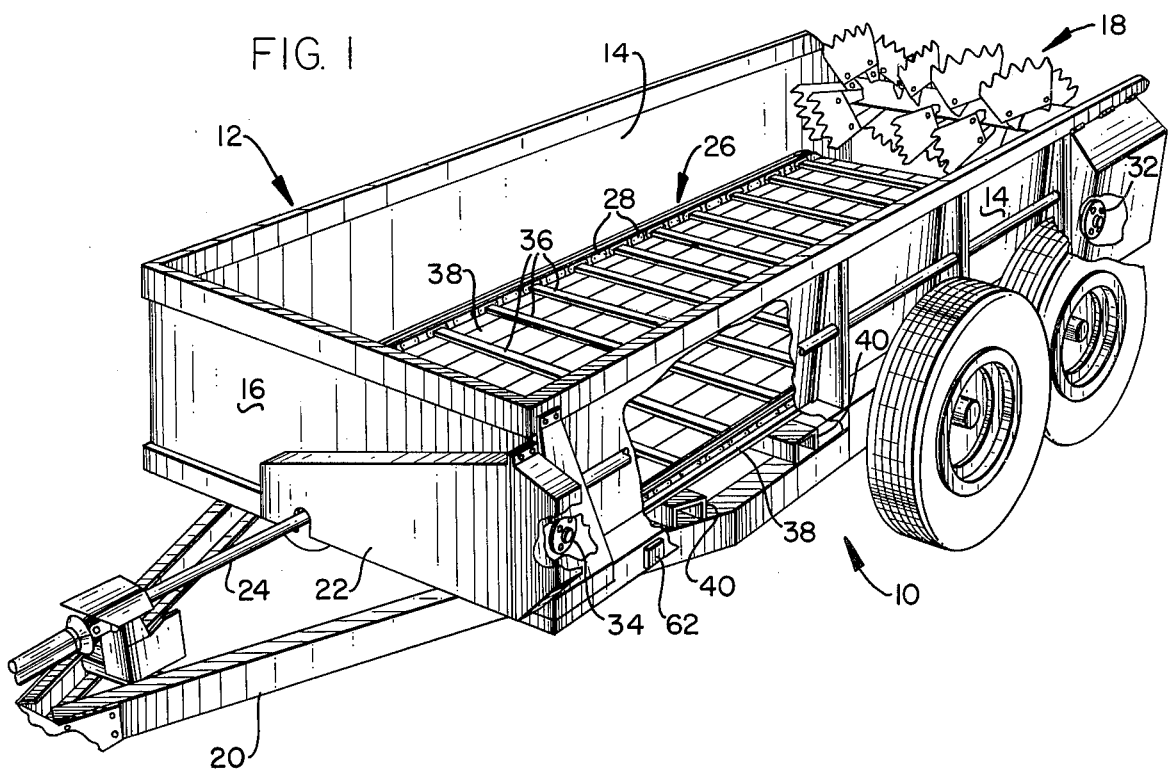
FIG. 1 is a three-quarter, front perspective view of a manure spreader vehicle having improvements therein made in accordance with the present invention, with some parts thereof being broken away therefrom, and some of the remaining parts being shown in cross section.

The figures of the drawings disclose a prior art ground supported vehicle 10 for spreading manure, having improvements incorporated therein made in accordance with the present invention. The vehicle is in the form of a wagon and preferably is provided with an upwardly opening bed or enclosure 12 having spaced sidewalls 14, a forward wall 16, and a trailing end portion. A manure spreader apparatus 18 of prior art design is operatively affixed at the trailing end of the vehicle.

The apparatus includes spaced longitudinal main frame members which converge to form a tongue 20 at the forward end thereof by which the apparatus can be pulled by a prime mover type vehicle, such as a farm tractor. A gear box 22 is driven by a power takeoff shaft 24 in the usual manner, for operating the various mechanism associated with the illustrated apparatus.

Spaced endless chains 28 and 30 are drivingly fitted about spaced-apart rollers mounted forward and aft at 32 and 34. Spreader bars 36 are arranged in spaced, parallel relationship respective to one another, with the terminal ends thereof being attached to the spaced-apart endless chains.

The floor 38 of the enclosure can be fabricated of wood or metal and is supported by a series of parallel, lateral, U-shaped members 40, which form transverse support members for the floor. The last said members are spaced apart from one another to cause the floor to be adequately bottom supported from the main frame 20. Located in underlying relationship respective to the floor 38 are a plurality of flat, rectangular heating elements 41 made in accordance with the present invention. The heating elements are in the form of panels, and each includes a metal base plate 42 which has one face contiguously placed against the bottom face of the floor. A plurality of electrical heating elements 44 are attached in heat conducting relationship to the plate 42 so that generated heat emitted therefrom is readily transferred from the element, through the plate member 42, and into the floor.

Thermal insulation 46 prevents loss of heat outwardly through the member 41 toward ambient. The insulation 46 preferably is a self-supporting, foamed plastic having capabilities to withstand substantially high temperatures, and at the same time, provides a suitable K-factor for the control of heat transfer. A secondary external coating 48 can be added to protect the form from environmental abuse. Where deemed desired, an unbroken, thermal seal can be provided across the entire bottom of the floor 38 in the manner of FIG. 5 to thereby prevent heat loss occurring through the exposed frame members 40.

A bottom view of the member 41 is disclosed in FIG. 3, and as seen therein, a plurality of parallel electrical heating elements 44 are electrically connected in series relationship respective to one another at 52 and 54 by electrical wiring 56. Electrical connector 50 is of conventional design and is used to connect each of the panels in parallel and to a common source of current.

FIGS. 5 and 8 set forth a modification of the heating element seen in FIGS. 4 and 7 wherein a flat insulator 144, such as ceramic, having good electrical insulation and high heat transfer properties, supports the individual heating wires 52 and 54 to thereby provide a low profile for the heating panel apparatus 41.

Figure 2:
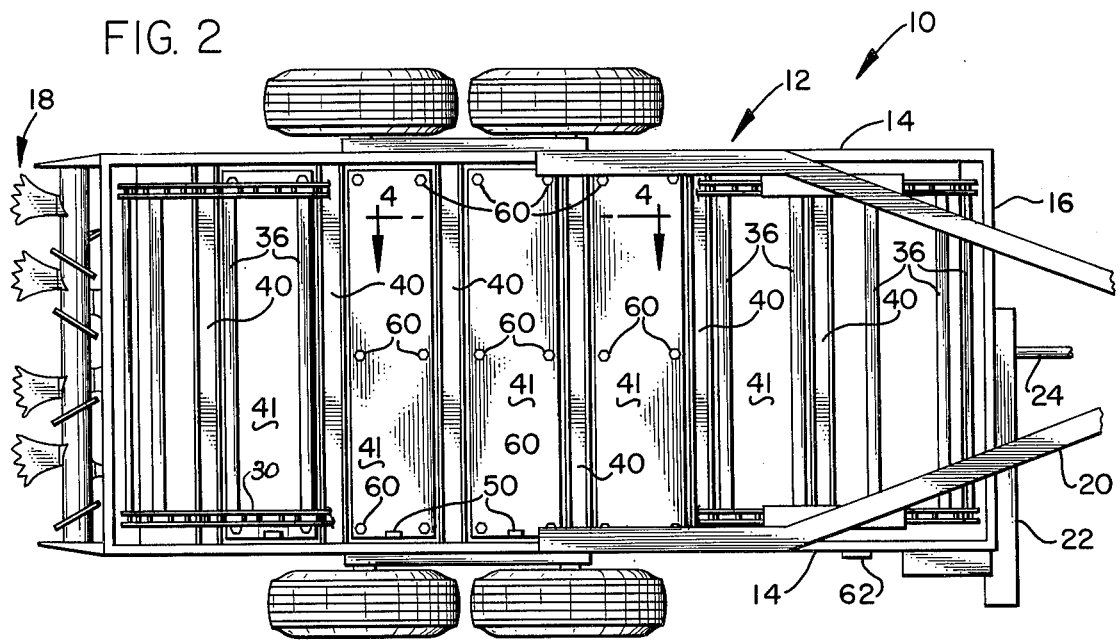
FIG. 2 is a bottom view of the vehicle disclosed in FIG. 1, with some parts thereof being removed therefrom.

FIG. 2 illustrates a bottom view of the spreader and illustrates the spaced panels 41 of the invention being attached by any suitable fastener means 60 which are placed through the illustrated apertures 58 of FIG. 3. The panels are each connected electrically in parallel with one another at 50 and to the disconnect 62. The disconnect is of conventional design and enables connecting a domestic supply of current to the circuitry.

In the embodiment disclosed in FIGS. 5 and 6, the individual panels 141 are seen to be provided with suitable heating elements 144 which are connected parallel to one another and to the disconnect 62. A thermostat 64 is attached to the plate member 42 and to the illustrated thermally actuated switch 66 to thereby enable the temperature between the floor and the plate 42 to be controlled within safe limits. The remaining panels 41 can be similarly individually controlled in the before described manner. This expedient prevents isolated floor areas from becoming overheated.

For example, when manure covers only half the floor area, for example, the rear half of the bed, the covered floor is effectively insulated by the manure while the uncovered floor is not insulated by manure. Accordingly, it is wasteful to continue to heat the floor area beyond a temperature which assures that the isolated area is warmed; and accordingly, the individual thermostats offer considerable savings in energy and also extend the life of the individual panels.

The insulation 46 preferably is a foamed, sprayed-on material which is relatively noncombustible and provides good thermal insulation. The exterior 48 can be painted with a tough coating to protect the insulation from the deleterious effects of outdoor environment. One source of this material is Cellin Manufacturing Company, Post Office Box 224, Lorton, Va., 22079.

Other foamed plastics may be used as insulation at 46; however, the combustible nature of some plastics require precautionary coating of fire retardants to reduce the likelihood of fire from inadvertent short circuitry of the electrical system.

The present invention prevents the crosspieces 36 of the conveyor from freezing to the bottom floor 38 of the bed, thereby eliminating the heretofore problem of breaking the drag chains 28 and drive cogs 32, 34 of the apparatus. The present combination maintains the bed of the spreader warm in freezing temperatures by utilizing domestic current for heating purposes.

The individual heating panels preferably include inexpensive, quick disconnect electrical plugs 50 which are waterproof and utilized to complete the circuitry to the individual panels used on the entire area of the spreader bottom. This expedient enables the individual panels to be replaced where the invention is practiced on spreaders which are equipped with heating panels at the factory.

The electrical system preferably is protected by a suitable fuse in the main line, as well as a smaller fuse which is incorporated into each of the individual panels so that should a short circuit occur in any one single panel, the fuse associated therewith will render the defective panel inoperative, and the remainder of the panels will maintain the remaining floor area in a heated condition.

The entire system is located under the floor of the spreader and is sufficiently compact to eliminate any problem of interference of the drag chain or other objects which otherwise might inadvertently strike the system to cause a problem.

The present invention can be used on any type of material handling apparatus that has difficulty in conveying material in freezing temperatures.

The present system saves many manhours of labor in maintaining the spreaders in a thawed configuration during winter weather, and furthermore saves hundreds of dollars each winter which otherwise must be spent for costly drag chain and drag cog replacements, thereby cutting maintenance cost on this type of equipment.

I claim:

1. A ground supported, manure spreading vehicle having a heated floor and an upwardly opening bed mounted thereon within which manure can be stored;

said bed having spaced sidewalls and a front wall upwardly extending from said floor;

said bed includes a main frame comprised of spaced, longitudinal frame members, spaced transverse support members affixed to said frame members, said floor being supported by said transverse support members;

said bed having a trailing end spaced from said front wall; a manure spreader means operatively positioned in supported relationship at said trailing end for distributing any manure which may be transferred thereinto; and conveyor means positioned adjacent to said floor for moving manure from said bed to said manure spreader;

said heated floor includes a heating apparatus by which said floor can be heated to a temperature which prevents manure from freezing to said floor when manure is stored therewithin; said heating apparatus includes a plurality of spaced, individual panels, each of said panels having spaced ends which are disposed adjacent to said walls, and further including spaced edges extending into proximity of adjacent ones of said transverse members;

an electrical heating element embedded within and affixed to each said panel, circuit means by which each said heating element can be connected to a common source of current, means by which each said panel is affixed with one side thereof disposed in heat transfer relationship to the underside of said floor, and means insulating the other side of said panel so that when a source of electrical current is connected to said heating element, said panel is heated and heat therefrom is transferred into said floor, thereby preventing manure from freezing to the upper side of said floor.

2. The apparatus of claim 1 wherein each said panel includes spaced, superimposed metal plate members disposed parallel to one another with said heating element being sandwiched therebetween; and electrical insulation material of high heat conductivity being contained between said heating elements.

3. The apparatus of claim 2 wherein said plate members are removably affixed to the lower side of said floor; and said insulation is a self-supporting, sprayed, foamed plastic.

4. The apparatus of claim 3 wherein each of said heating elements are parallel connected electrically respective to one another, and further including a thermostat means connected for controlling the temperature of the bed.

5. The apparatus of claim 3 wherein there is included a thermostat for each panel, said thermostat includes a switch arranged to interrupt current flow to said heating element of a panel, a sensor for actuating said swicth, said sensor being placed to sense the temperature of the panel, and circuit means by which said thermostat, switch, and sensor are connected to said panel and to said source of current.

6. Apparatus for spreading material such as manure upon the ground comprising a ground supported vehicle having an upwardly opening bed mounted thereon within which material to be spread can be stored; said bed having a floor for supporting a supply of material; spaced sidewalls, and a front wall connected to and upwardly extending from said floor;

said vehicle includes a main frame comprised of spaced, longitudinal frame members, spaced transverse support members affixed to said frame members, said floor being supported by said transverse support members;

said bed having a trailing end spaced from said front wall; material spreader means operatively positioned in supported relationship at said trailing end for distributing any material which may be transferred thereinto; conveyor means lying adjacent to said floor for moving material along the floor of said bed towards said spreader means;

a plurality of heating panels underlying and attached to said floor for elevating the temperature of the floor to a temperature which prevents the material stored adjacent to the floor from freezing thereto; said heating panel includes spaced, individual electrical heating elements affixed within each panel, each of said panels having spaced opposed ends which are disposed adjacent to said walls, and further including spaced opposed edges extending into proximity of adjacent ones of said transverse members;

one face of said panel being placed in heat transfer contact with the underside of the floor; and, means insulating the remaining opposed lower side of said panel;

so that heat flows from said element, upwardly through the panel and into said floor, and is transferred into any material which may be supported on the floor;

circuit means by which each said heating element is connected to a common source of current, means by which each said panel is affixed in heat transfer relationship to said floor so that when a source of electrical current is connected to said element, said panel becomes heated and the heat therefrom is transferred into said floor.

7. The apparatus of claim 6 wherein said panel includes spaced, superimposed metal plate members superimposed upon and disposed parallel to one another with said heating element being sandwiched therebetween; electrical insulation material of high heat conductivity being contained between said plate members and about said heating elements;

means by which said plate members are removably affixed to the lower side of said floor; and an outer layer of a self-supporting, sprayed, foamed plastic material for insulating the underside of the bed.

* * * * *